(12) United States Patent
Kohli et al.

(10) Patent No.: US 11,288,889 B2
(45) Date of Patent: Mar. 29, 2022

(54) VEHICLE OPERATION

(71) Applicant: Ford Global Technologies, LLC, Dearborn, MI (US)

(72) Inventors: Naman Kohli, San Jose, CA (US); Anuja Anil Shirsat, Mountain View, CA (US); Sonal Doomra, Santa Clara, CA (US); Matthew Castaldini, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 16/930,630

(22) Filed: Jul. 16, 2020

(65) Prior Publication Data

US 2022/0019820 A1 Jan. 20, 2022

(51) Int. Cl.
*G06V 20/58* (2022.01)
*G05D 1/02* (2020.01)
*B60W 60/00* (2020.01)
*G06T 7/73* (2017.01)

(52) U.S. Cl.
CPC ....... *G06V 20/582* (2022.01); *B60W 60/0018* (2020.02); *G05D 1/0246* (2013.01); *G06T 7/74* (2017.01); *B60W 2555/60* (2020.02); *G06T 2207/30252* (2013.01); *G06T 2210/12* (2013.01)

(58) Field of Classification Search
CPC ........ G06V 10/22; G06V 10/23; G06V 10/26; G06V 10/768; G06V 20/56; G06V 20/58; G06V 20/582; G06T 7/11; G06T 7/70; G06T 7/73; G06T 7/74; G06T 2207/20021; G06T 2207/30252; G06T 2210/12; G05D 1/0246
See application file for complete search history.

(56) References Cited

U.S. PATENT DOCUMENTS

| | | | |
|---|---|---|---|
| 8,233,670 B2 | 7/2012 | Moed et al. | 382/113 |
| 9,558,411 B1 | 1/2017 | Ferguson et al. | G06K 9/00818 |
| 9,939,815 B1 | 4/2018 | Silver et al. | G05D 1/0088 |
| 2017/0193312 A1* | 7/2017 | Ai et al. | G06V 10/56 |
| 2019/0012551 A1* | 1/2019 | Fung et al. | B60W 30/00 |
| 2020/0217667 A1* | 7/2020 | Kim et al. | G06V 10/255 |
| 2021/0042551 A1* | 2/2021 | Garcia | G06V 10/147 |

FOREIGN PATENT DOCUMENTS

EP 2026313 A1 2/2009

\* cited by examiner

*Primary Examiner* — Andrew W Johns
(74) *Attorney, Agent, or Firm* — Frank A. MacKenzie; Bejin Bieneman PLC

(57) ABSTRACT

A computer includes a processor and a memory, the memory storing instructions executable by the processor to determine a first bounding box for a road sign in an image, identify a second bounding box for a physical member, the second bounding box for the physical member extending from the first bounding box for the road sign, and upon identifying the second bounding box for the physical member, actuate one or more vehicle components.

20 Claims, 5 Drawing Sheets

VEHICLE OPERATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use computing devices configured to identify objects from image data collected by the vehicle sensors.

DETAILED DESCRIPTION

Figure 1:
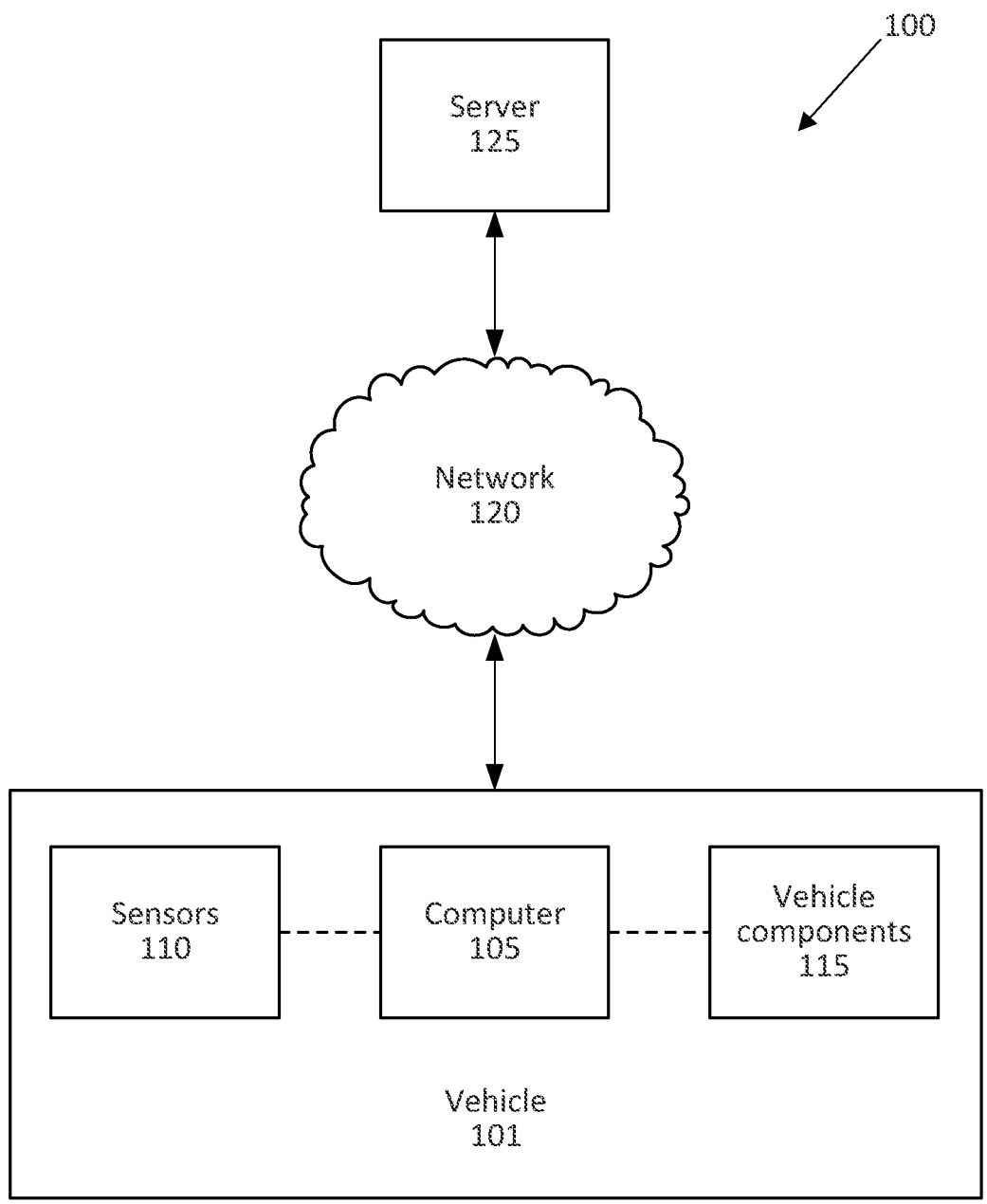
FIG. 1 is a diagram of an example system for identifying a road sign.

A system includes a computer including a processor and a memory, the memory storing instructions executable by the processor to determine a first bounding box for a road sign in an image, identify a second bounding box for a physical member, the second bounding box for the physical member extending from the first bounding box for the road sign, and upon identifying the second bounding box for the physical member, actuate one or more vehicle components.

The instructions can further include instructions to, upon identifying no second bounding box extending from the first bounding box, determine that the first bounding box indicates an actual road sign upon receiving a message from a server that a plurality of vehicles identified the actual road sign at a location at which the image was collected.

The instructions can further include instructions to determine that the first bounding box indicates the actual road sign when the plurality of vehicles exceeds a threshold.

The message from the server can include content of the actual road sign, and the instructions can further include instructions to actuate the one or more components based on the content of the actual road sign.

The instructions can further include instructions to identify a third bounding box for a vehicle and to identify whether the first bounding box is within the third bounding box for the vehicle.

The instructions can further include instructions to determine that the first bounding box includes an actual road sign when the first bounding box is not within the third bounding box for the vehicle.

The instructions can further include instructions to determine a ratio between an area of the first bounding box and an area of the third bounding box and to determine whether the first bounding box indicates the actual road sign based on the ratio.

The first bounding box can include at least one of a shape of the road sign, a word on the road sign, or a color of the road sign.

The instructions can further include instructions to identify the word on the road sign and to actuate the one or more vehicle components based on the identified word.

The instructions can further include instructions to identify the second bounding box extending from the first bounding box to a base supporting the physical member.

The first bounding box for the road sign can include a road rule, and the instructions can further include instructions to actuate the one or more vehicle components according to the road rule.

The road rule can be one of a posted speed limit, a rule to stop the vehicle, or a rule to yield to another vehicle.

The physical member can include at least one of a vertical post or a horizontal bar.

The instructions can further include instructions to, upon determining that the first bounding box does not indicate the actual road sign, to ignore the first bounding box.

A method includes determining a first bounding box for a road sign in an image, identifying a second bounding box for a physical member, the second bounding box for the physical member extending from the first bounding box for the road sign, and, upon identifying the second bounding box for the physical member, actuating one or more vehicle components.

The method can further include, upon identifying no second bounding box extending from the first bounding box, determining that the first bounding box indicates an actual road sign upon receiving a message from a server that a plurality of vehicles identified the actual road sign at a location at which the image was collected.

The method can further include determining that the first bounding box indicates the actual road sign when the plurality of vehicles exceeds a threshold.

The message from the server can include content of the actual road sign, and the method can further include actuating the one or more components based on the content of the actual road sign.

The method can further include identifying a third bounding box for a vehicle and identifying whether the first bounding box is within the third bounding box for the vehicle.

The method can further include determining that the first bounding box includes an actual road sign when the first bounding box is not within the third bounding box for the vehicle.

The method can further include determining a ratio between an area of the first bounding box and an area of the third bounding box and determining whether the first bounding box indicates the actual road sign based on the ratio.

The method can further include identifying the word on the road sign and actuating the one or more vehicle components based on the identified word.

The method can further include identifying the second bounding box extending from the first bounding box to a base supporting the physical member.

The first bounding box for the road sign can include a road rule, and the method can further include actuating the one or more vehicle components according to the road rule.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Roadways include road signs to inform operators of vehicles of road rules, i.e., regulations for vehicle operation on roadways such as stop commands and speed limits. The operators actuate components to follow the road rules. Vehicles can identify road signs on roadways. A computer in a vehicle can actuate vehicle components to follow the road rules. The computer can actuate one or more sensors to collect data of the road signs. Based on the collected data, the computer can use one or more techniques, such as an object recognition algorithm, to identify the road sign and the corresponding road rule.

The presently disclosed solution thus addresses problems in detection technology. For example, a computer may detect an object that appears to be a road sign but in fact is not. Such current inaccuracy in object detection can be problematic because, for example, such object does not include an enforceable road rule. For example, a decal affixed to a rear bumper of a vehicle can include an image similar to a road sign, but the decal does not specify a road rule that a vehicle should follow. A "decal" is a printed object (such as a sticker) that includes a design or label. A decal can include a design that appears similar to a road sign, e.g., the decal can be a red octagon that includes the word "STOP," appearing like a stop sign typically on a roadway. Reliably distinguishing road signs from objects that are not road signs improves operation of the vehicle by more accurately identifying false positive identifications of road signs (that may be decals) than conventional image processing techniques, improving detection of objects by the computer Improved object detection reduces unnecessary actuation of components based on the false positive identifications caused by inaccurate object detection. That is, a computer can use bounding boxes of the road sign, other vehicles, and support structures to distinguish between road signs and objects that are not road signs. Identifying the bounding box of the road sign within the bounding box of another vehicle can indicate that the bounding box of the road sign includes a decal rather than an actual road sign. The bounding boxes can be implemented to distinguish features of actual road signs from objects that are not road signs more accurately by identifying features of actual road signs, such as physical members and supports, not present in decals. Present techniques for processing images collected by vehicle sensors can therefore reduce false positive identification of objects that are not road signs.

FIG. 1 illustrates an example system 100 for operating a vehicle 101. A computer 105 in the vehicle 101 is programmed to receive collected data from one or more sensors 110. For example, vehicle 101 data may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. For example, the computer 105 can be a generic computer with a processor and memory as described above and/or may include a dedicated electronic circuit including an ASIC that is manufactured for a particular operation, e.g., an ASIC for processing sensor data and/or communicating the sensor data. In another example, computer 105 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 105.

In addition, the computer 105 may be programmed for communicating with the network 120, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 110. The memory can be a separate device from the computer 105, and the computer 105 can retrieve information stored by the memory via a network in the vehicle 101, e.g., over a CAN bus, a wireless network, etc. Alternatively or additionally, the memory can be part of the computer 105, e.g., as a memory of the computer 105.

Sensors 110 can include a variety of devices that collect data. For example, various controllers in a vehicle 101 may operate as sensors 110 to provide data via the vehicle 101 network or bus, e.g., data relating to vehicle speed, acceleration, location, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, LIDAR, and/or ultrasonic transducers.

Collected data can include a variety of data collected in a vehicle 101. Examples of collected data are provided above, and moreover, data are generally collected using one or more sensors 110, and may additionally include data calculated therefrom in the computer 105, and/or at the server 125. In general, collected data may include any data that may be gathered by the sensors 110 and/or computed from such data.

The vehicle 101 can include a plurality of vehicle components 115. In this context, each vehicle component 115 includes one or more hardware components adapted to perform a mechanical function or operation—such as moving the vehicle 101, slowing or stopping the vehicle 101, steering the vehicle 101, etc. Non-limiting examples of components 115 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 115 can include computing devices, e.g., electronic control units (ECUs) or the like and/or computing devices such as described above with respect to the computer 105, and that likewise communicate via a vehicle 101 network.

A vehicle 101 can operate in one of a fully autonomous mode, a semiautonomous mode, or a non-autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 120 connected to a server 125. The computer 105 can further be programmed to communicate with one or more remote sites such as the server 125, via the network 120, such remote site possibly including a processor and a memory. The network 120 represents one or more mechanisms by which a vehicle computer 105 may communicate with a remote server 125. Accordingly, the network 120 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
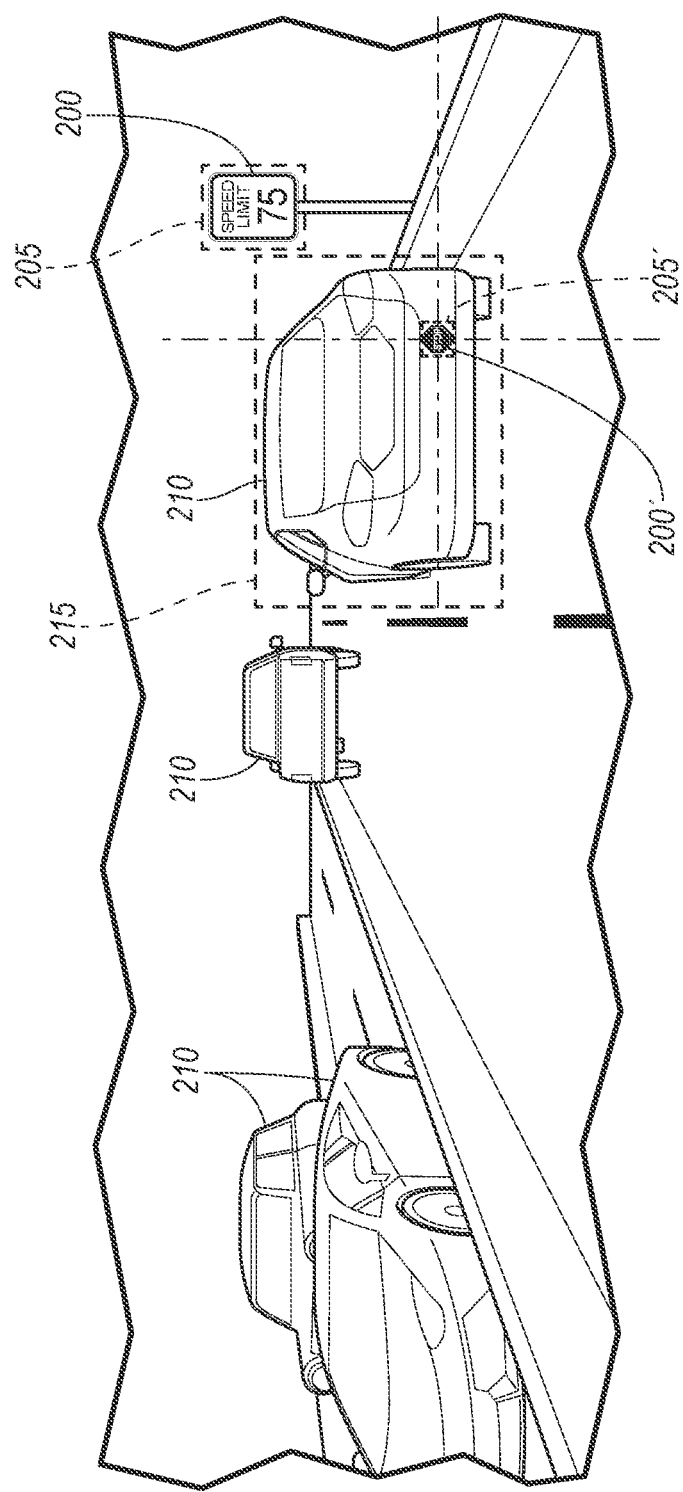
FIG. 2 is a view of a vehicle identifying the road sign.

FIG. 2 is a view of a vehicle 101 detecting a road sign 200. A "road sign" is a physical structure on or near a roadway that provides information for users of vehicles 101. For example, the road sign 200 can display a road rule, i.e., a regulation or law governing operation of vehicles 101. The road rule can be, e.g., a posted speed limit, a "stop" command to stop the vehicle 101, a "yield" command to yield to another vehicle 101, a pedestrian crossing, an animal crossing, a direction of travel, etc. Alternatively, the road sign 200 can display information about a location at or near the road sign 200, e.g., a street name, a highway exit number, etc.

A computer 105 in the vehicle 101 can actuate a sensor 110 to collect data about the road sign 200. The sensor 110 can be a camera 110, and the camera 110 can collect one or more images including the road sign 200. The computer 105 can identify a bounding box 205 of the road sign 200. A "bounding box" is a closed boundary defining a set of pixels. For example, pixels within a bounding box can represent a same object, e.g., a road sign 200, another vehicle 101, etc., e.g., a bounding box can define pixels representing an image of an object. The computer 105 can use a conventional image processing and object identifying technique (e.g., Canny edge detection, deep learning object detection, etc.) to identify the bounding box 205 that includes the road sign 200. The bounding box 205 can include at least one of a shape of the road sign 200, a word on the road sign 200, and/or a color of the road sign 200. The computer 105 can identify the shape, the word, and/or the color of the road sign 200, and can actuate one or more components 115 based on the identified shape, word, and/or color. For example, if the computer 105 identifies the shape of the road sign 200 as an octagon, a word on the road sign 200 stating "STOP," and/or a red road sign 200, the computer 105 can actuate a brake 115 to stop the vehicle 101 prior to the road sign 200. In another example, if the computer 105 identifies alphanumeric characters on the road sign 200 including "SPEED LIMIT" and a number, the computer 105 can actuate a propulsion 115 and a brake 115 to accelerate or decelerate the vehicle 101 to maintain a speed below the posted speed limit.

The computer 105 can identify one or more target vehicles 210. A "target" vehicle 210 is a vehicle other than the vehicle 101, which can be a "host" vehicle 101. The host vehicle 101 can use information about the target vehicles 210 to actuate components 120. The target vehicle 210 is a vehicle 101 within a field of view of at least one of the sensors 110. The sensor 110 can collect data including both the road sign 200 and the target vehicle 210. The computer 105 can identify a vehicle bounding box 215 that includes the target vehicle 210. As described above, the computer 105 can use the bounding boxes 205, 215 to determine whether the image data of the road sign 200 indicates an actual road sign 200 or a decal of a road sign 200. If the image data of the road sign 200 is a decal or the like affixed to the target vehicle 210, the bounding box 205 of the road sign 200 would be entirely within the vehicle bounding box 215 of the target vehicle 210. Thus, if the bounding box 205 is not within the vehicle bounding box 215, then the bounding box 205 indicates an actual road sign 200.

Alternatively or additionally, the computer 105 can determine a ratio between an area of the bounding box 205 and an area of the vehicle bounding box 215. The area of a decal relative to the target vehicle 210 is typically smaller than the area of an actual road sign 200 relative to the target vehicle 210. The computer 105 can compare the ratio between the areas of the bounding boxes 205, 215 to a predetermined threshold. The threshold can be determined by comparing ratios of areas of actual road signs 200, actual vehicles 101, and actual decals to determine a maximum ratio between an area of an actual decal or the like and an area of a vehicle 101. The maximum ratio can be the threshold. When the ratio exceeds the threshold, the computer 105 can determine that the bounding box 205 includes an actual road sign 200.

FIG. 2 shows two road signs 200, 200' and two bounding boxes 205, 205'. The bounding box 205' includes a decal on the target vehicle 210, and the computer 105 should not actuate components 115 according to the bounding box 205'. The road sign 200 and the bounding box 205 are not within the vehicle bounding box 215 of the target vehicle 210, and the computer 105 determines that the bounding box 205 includes an actual road sign 200. The bounding box 205' is within the vehicle bounding box 215, and the computer 105 can use another technique, e.g., one of the techniques described below and illustrated in FIGS. 3 and 4, to determine whether the bounding box 205' includes an actual road sign.

Figure 3:
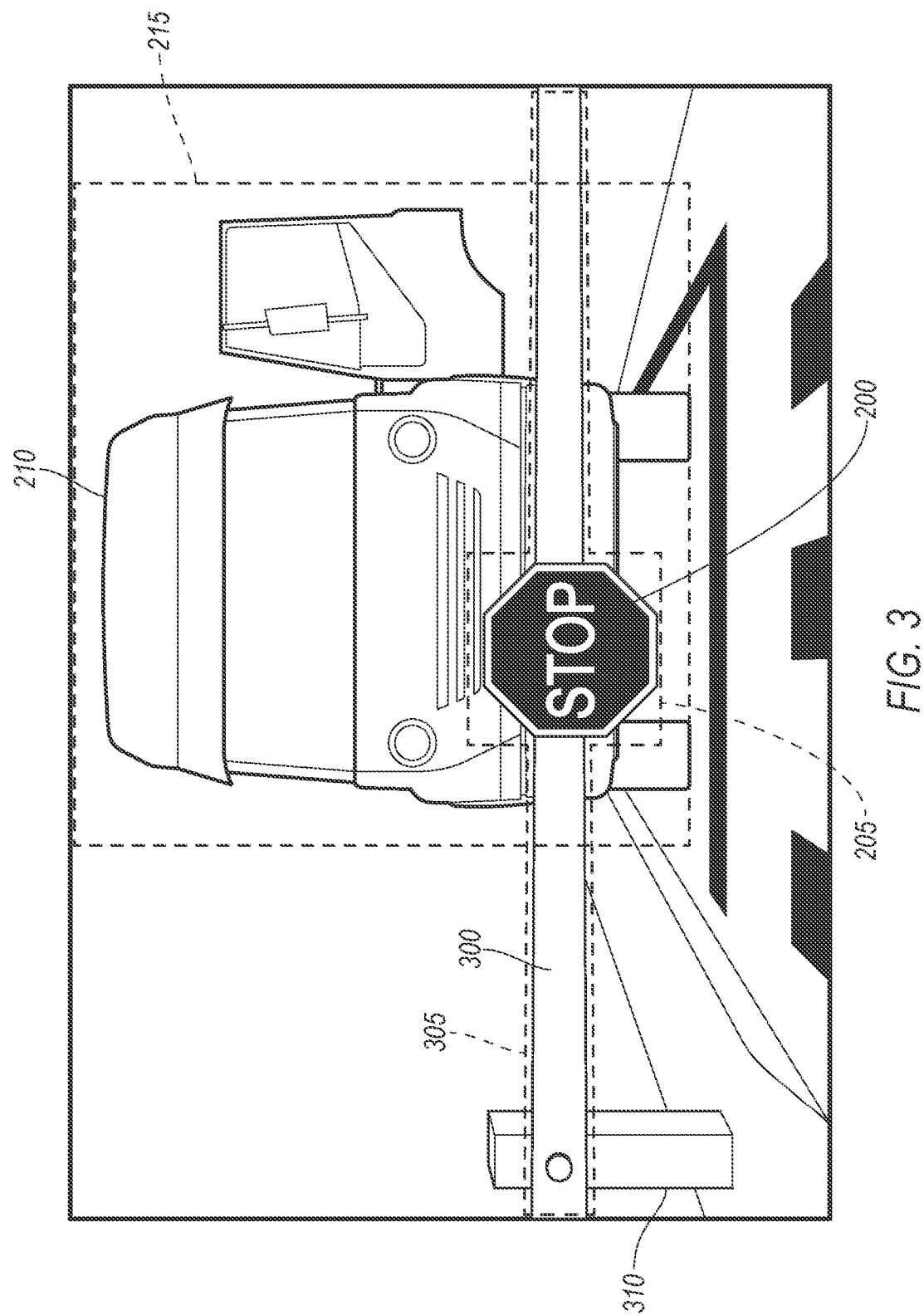
FIG. 3 is a view of the vehicle identifying a physical member extending from the road sign.

FIG. 3 is a view of a road sign 200 with a physical member 300. A "physical member" is a structure that supports the road sign 200, e.g., a vertical post, a horizontal bar, a rod, etc. That is, the physical member 300 can be a physical mounting structure for the road sign 200. For example, the physical member 300 shown in FIG. 3 is a horizontal bar. The computer 105 can identify a bounding box 305 of the physical member 300. For example, the computer 105 can collect an image from a camera 110 to identify the bounding box 305 of the physical member 300. The physical member 300 can extend from the road sign 200 to a base 310. The "base" is a platform or other structure that secures the physical member 300 to the ground. That is, the physical member 300 physically mounts the road sign 200 to the base 310.

The computer 105 can identify a bounding box 205 of the road sign 200, i.e., defining a set of pixels representing the road sign 200. The bounding box 205 of the road sign 200 is within a vehicle bounding box 215 of a target vehicle 210. As described above, when the computer 105 determines that the bounding box 205 is within the vehicle bounding box 215, the computer 105 can determine that the bounding box 205 may include a decal rather than an actual road sign. A decal would typically not be affixed to a physical member 300, so identifying a physical member 300 extending from the road sign 200 likely indicates an actual road sign 200.

The computer 105 can identify the bounding box 305 of the physical member 300. The bounding box 305 of the physical member 300 extends from the bounding box 205 of the road sign 200 to the base 310. When the computer 105 identifies the bounding box 305 of the physical member 300 extending from the bounding box 205 of the road sign 200, the computer 105 can determine that the bounding box 205 includes an actual road sign 200.

Figure 4:
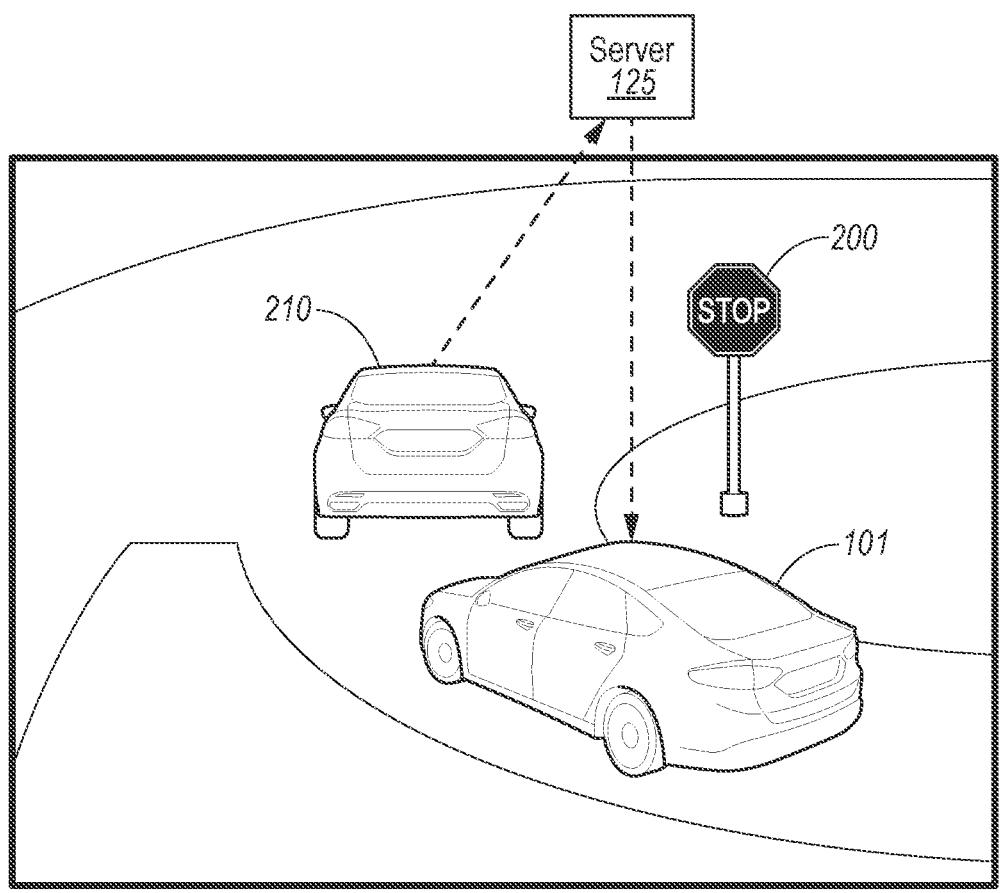
FIG. 4 is a view of the vehicle communicating with a server to identify the road sign.

FIG. 4 is a view of a vehicle 101, a target vehicle 210 and a road sign 200. The target vehicle 210 can identify the road sign 200 using, e.g., an image processing technique such as Canny edge detection and/or deep learning object detection. The target vehicle 210 can transmit the identification of the road sign 200 to a server 125. The server 125 can store identified road signs 200 sent from other target vehicles 210 and locations at which the road signs 200 are identified. That is, the server 125 can store a plurality of identified road signs 200, a respective location at which each of the plurality of road signs 200 was identified, and a respective number of target vehicles 210 that identified each of the plurality of road signs 200. The server 125 can store the plurality of identified road signs 200 for a specific geographic area, e.g., a geofenced area defined by a circle having an origin at a predetermined location and a radius determined to include a specific area of, e.g., a municipality. The origin and the radius can be determined by, e.g., a system manufacturer. Using a server 125 for a specific geofenced area rather than for a larger, unfenced area allows the server 125 to use limited memory capacity to store more road signs 200 than for the unfenced area. By using a plurality of servers 125, each server 125 storing data for one of the geofenced areas, the computer 105 can communicate with only the server 125 for the specific geofenced area, reducing communication and computations performed compared to communicating with one or more servers 125 for a larger, unfenced area.

The computer 105 of the vehicle 101 can send a request to the server 125 upon collecting an image of a road sign 200. As described above, the bounding box 205 may include an actual road sign 200 or may include a decal that looks like a road sign 200. The request can include a location at which the computer 105 captured the image of the road sign 200. The server 125 can send a message to the computer 105 indicating the number of target vehicles 210 that identified a road sign 200 at the location. If a plurality of target vehicles 210 identified a road sign 200 at the location, the computer 105 can determine that the image includes an actual road sign 200. That is, if the number of target vehicles 210 received from the server 125 exceeds a predetermined threshold, the computer 105 can determine that the image includes an actual road sign 200 and actuate one or more components 115 to follow the road sign 200. The predetermined threshold can be a number determined by, e.g., a manufacturer, that indicates that the identification of the road sign 200 is trustworthy. For example, the threshold can be determined based on simulation testing of virtual vehicles 101, 210 detecting road signs 200 at a true positive rate exceeding a manufacturer-specified percentage, e.g., 80%. The computer 105 can identify a current location of the vehicle 101 and send the request to the server 125 when the current location is within the specific geographic area described above.

The computer 105 can send the request to the server 125 upon identifying that there is no bounding box 305, i.e., identifying an absence of a bounding box 305, of a physical member 300 extending from the bounding box 205 of the road sign 200. That is, the computer 105 can first attempt to identify the physical member 300 to determine whether the bounding box 205 includes an actual road sign 200. When the computer 105 cannot identify the physical member 300, the computer 105 can send the request to the server 125 with the location at which the computer 105 collected the image. The server 125 can send a message to the computer 105 including an indication of whether other target vehicles 210 have identified a road sign 200 at the location and/or the content of the road sign 200.

When the computer 105 determines that the bounding box 205 includes an actual road sign 200 by one of the techniques described above, the computer 105 can actuate one or more components 115 to follow instructions on the road sign 200. That is, the road sign 200 can include a road rule, as described above, and the computer 105 can actuate one or more components 115 according to the road rule. The computer 105 can use a conventional image processing technique, such as text recognition, a neural network, etc., to data collected by one or more sensors 110 to identify at least one of a shape, a color, and/or text on the road sign 200. Upon identifying the shape, the color, and/or the text on the road sign, 200, the computer 105 can compare the identification to a predetermined library of road sign 200 data stored in a memory and/or the server 130, including the road rule associated with each road sign 200. Upon identifying the road sign 200 from the data, the computer 105 can identify the road rule associated with the road sign 200. The memory of the computer 105 can include one or more instructions to components 120 based on the specific road rule, and the computer 105 can actuate the components 120 according to the instructions stored in the memory. For example, if the road rule is a "stop" command, the computer 105 can actuate a brake 115 to stop the vehicle 101 prior to reaching the road sign 200. In another example, if the road rule is a posted speed limit, the computer 105 can actuate a propulsion 115 to maintain a vehicle speed below the posted speed limit. In another example, if the road rule is a "yield" command, the computer 105 can actuate a camera 1-10 to determine whether there are other vehicles 101 near the road sign 200 and, upon identifying another vehicle 101, can actuate the brake 115 to stop the vehicle 101 prior to reaching the road sign 200.

When the computer 105 determines that the bounding box 205 does not include an actual road sign 200, the computer 105 can ignore the bounding box 205. That is, when the bounding box 205 does not include an actual road sign 200, the computer 105 can determine that the bounding box 205 includes a decal that does not include a road rule that the vehicle 101 must follow. The computer 105 can determine not to actuate components 115 when the bounding box 205 includes the decal.

Figure 5:
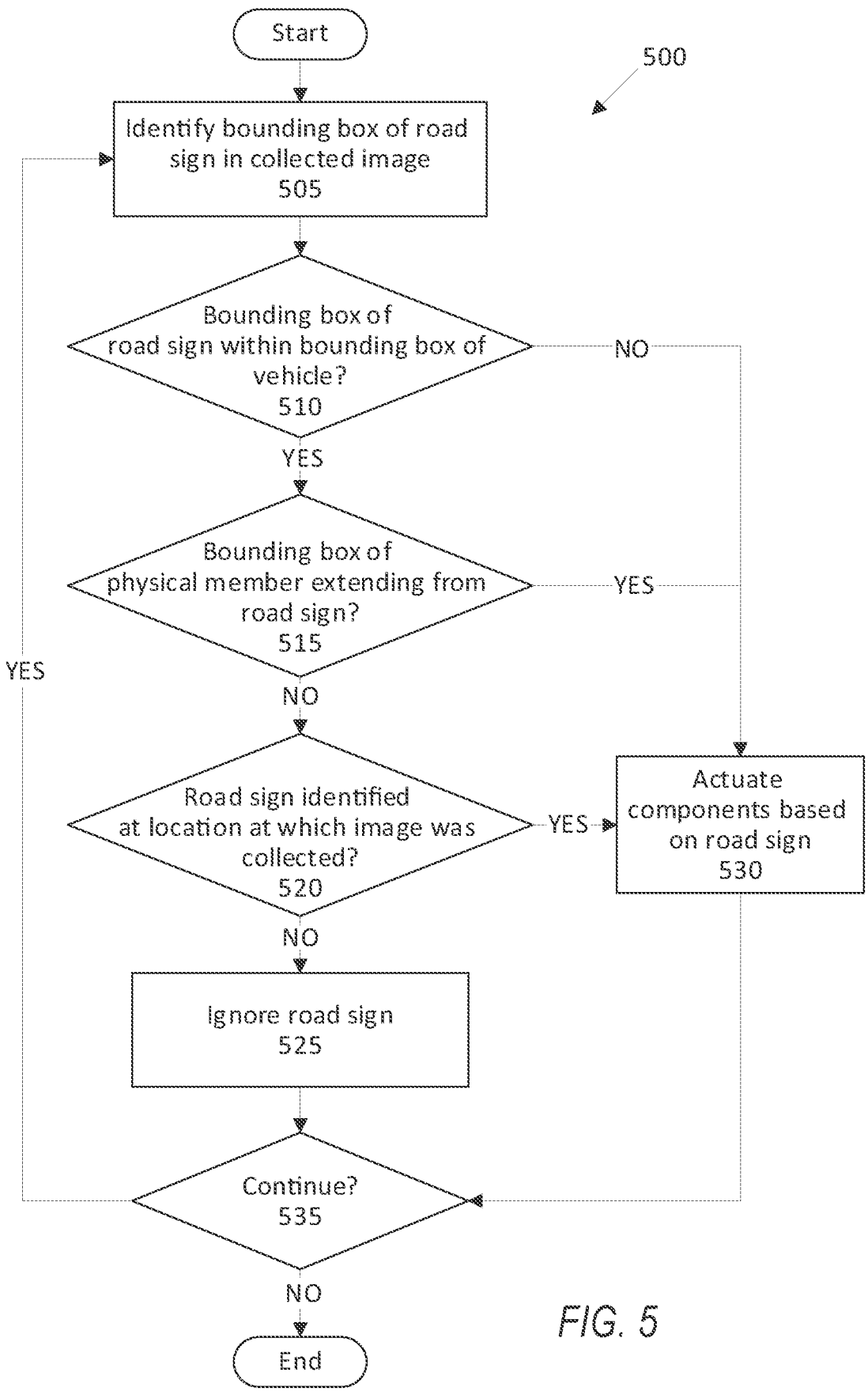
FIG. 5 is a diagram of an example process for identifying the road sign.

FIG. 5 is a diagram of an example process 500 for identifying a road sign 200. The process 500 begins in a block 505, in which a computer 105 in a vehicle 101 identifies a bounding box 205 including the road sign 200. The computer 105 can actuate a camera 110 to collect an image of the road sign 200. The computer 105 can use a conventional image processing technique, such as Canny edge detection and/or deep learning object detection, to identify the bounding box 205.

Next, in a block 510, the computer 105 determines whether the bounding box 205 including the road sign 200 is within a bounding box 215 of another vehicle 101. When the bounding box 205 of the road sign 200 is completely within the bounding box 215 of another vehicle 101, the bounding box 205 may include a decal instead of a road sign 200. When the bounding box 205 of the road sign 200 is not within the bounding box 215 of another vehicle 101, the bounding box 205 likely includes the road sign 200. If the bounding box 205 of the road sign 200 is within the bounding box 215 of another vehicle 101, the process 500 continues in a block 515. Otherwise, the process 500 continues in a block 530.

In the block 515, the computer 105 determines whether there is a bounding box 305 of a physical member 300 extending from the bounding box 205 of the road sign 200. If the computer 105 identifies the physical member 300, the computer 105 can determine that the bounding box 205 includes the road sign 200. If the computer 105 determines that there is a bounding box 305 of a physical member 300 extending from the bounding box 205 of the road sign 200, the process 500 continues in the block 530. Otherwise, the process 500 continues in a block 520.

In the block 520, the computer 105 sends a request to a server 125 to determine whether one or more target vehicles 210 have identified the road sign 200 at the location at which the computer 105 collected the image. As described above, the server 125 can store identified road signs 200 sent from other target vehicles 210 and locations at which the road signs 200 are identified within a specified geographic area. Upon recognizing the road sign 200, the target vehicles 210 can send a message to the server 125 indicating the detection of the road sign 200. The server 125 can send a message to the computer 105 indicating a number of vehicles 210 that identified the road sign 200. If the number of vehicles 210 that identified the road sign 200 exceeds a predetermined threshold, the process 500 continues in the block 530. Otherwise, the process 500 continues to a block 525.

In the block 525, the computer 105 ignores the road sign 200. That is, the computer 105 determines that the bounding box 205 includes a decal, and not an actual road sign 200, and does not actuate components 115 according to the content of the decal. Ignoring the road sign 200 reduces unnecessary actuation of vehicle components 115, reducing power consumption and computation performed by the computer 105 compared to actuating components 115 based on the decal.

In the block 530, the computer 105 actuates one or more components 115 based on the content of the road sign 200. For example, if the road sign 200 includes a "stop" command, the computer 105 can actuate a brake 115 to stop the vehicle 101 prior to reaching the road sign 200. In another example, if the road sign 200 includes a posted speed limit, the computer 105 can actuate a propulsion 115 and/or a brake 115 to accelerate or decelerate the vehicle 101 to a speed below the posted speed limit.

Next, in a block 535, the computer 105 determines whether to continue the process 500. For example, the computer 105 can determine to continue the process 500 if the vehicle 101 is still on a route to a destination. If the computer 105 determines to continue, the process 500 returns to the block 505. Otherwise, the process 500 ends.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The adjectives "first," "second," and "third" are used throughout this document as identifiers and are not intended to signify importance or order.

What is claimed is:

1. A system, comprising a computer including a processor and a memory, the memory storing instructions executable by the processor to:
   determine a first bounding box for a road sign in an image;
   identify a second bounding box for a physical member, the second bounding box for the physical member extending from the first bounding box for the road sign; and
   upon identifying the second bounding box for the physical member, actuate one or more vehicle components.

2. The system of claim 1, wherein the instructions further include instructions to, upon identifying no second bounding box extending from the first bounding box, determine that the first bounding box indicates an actual road sign upon receiving a message from a server that a plurality of vehicles identified the actual road sign at a location at which the image was collected.

3. The system of claim 2, wherein the instructions further include instructions to determine that the first bounding box indicates the actual road sign when the plurality of vehicles exceeds a threshold.

4. The system of claim 2, wherein the message from the server includes content of the actual road sign, and the instructions further include instructions to actuate the one or more components based on the content of the actual road sign.

5. The system of claim 1, wherein the instructions further include instructions to identify a third bounding box for a vehicle and to identify whether the first bounding box is within the third bounding box for the vehicle.

6. The system of claim 5, wherein the instructions further include instructions to determine that the first bounding box includes an actual road sign when the first bounding box is not within the third bounding box for the vehicle.

7. The system of claim 5, wherein the instructions further include instructions to determine a ratio between an area of the first bounding box and an area of the third bounding box and to determine whether the first bounding box indicates the actual road sign based on the ratio.

8. The system of claim 1, wherein the first bounding box includes at least one of a shape of the road sign, a word on the road sign, or a color of the road sign.

9. The system of claim 8, wherein the instructions further include instructions to identify the word on the road sign and to actuate the one or more vehicle components based on the identified word.

10. The system of claim 1, wherein the instructions further include instructions to identify the second bounding box extending from the first bounding box to a base supporting the physical member.

11. The system of claim 1, wherein the first bounding box for the road sign includes a road rule, and the instructions further include instructions to actuate the one or more vehicle components according to the road rule.

12. The system of claim 11, wherein the road rule is one of a posted speed limit, a rule to stop the vehicle, or a rule to yield to another vehicle.

13. The system of claim 1, wherein the physical member includes at least one of a vertical post or a horizontal bar.

14. The system of claim 1, wherein the instructions further include instructions to, upon determining that the first bounding box does not indicate the actual road sign, to ignore the first bounding box.

15. A method, comprising:
    determining a first bounding box for a road sign in an image;
    identifying a second bounding box for a physical member, the second bounding box for the physical member extending from the first bounding box for the road sign; and
    upon identifying the second bounding box for the physical member, actuating one or more vehicle components.

16. The method of claim 15, further comprising, upon identifying no second bounding box extending from the first bounding box, determining that the first bounding box indicates an actual road sign upon receiving a message from a server that a plurality of vehicles identified the actual road sign at a location at which the image was collected.

17. The method of claim 15, further comprising identifying a third bounding box for a vehicle and identifying whether the first bounding box for the road sign is within the third bounding box of the vehicle.

18. The method of claim 17, further comprising determining that the first bounding box includes an actual road sign when the first bounding box is not within the third bounding box.

19. The method of claim 15, wherein the first bounding box includes at least one of a shape of the road sign, a word on the road sign, or a color of the road sign.

20. The method of claim 15, wherein the first bounding box for the road sign includes a road rule, and the method further comprises actuating the one or more vehicle components according to the road rule.

\* \* \* \* \*